Jan. 5, 1926.            1,568,193
H. E. SNODGRASS ET AL
METHOD OF AND APPARATUS FOR WELDING
Filed March 24, 1922    2 Sheets-Sheet 2
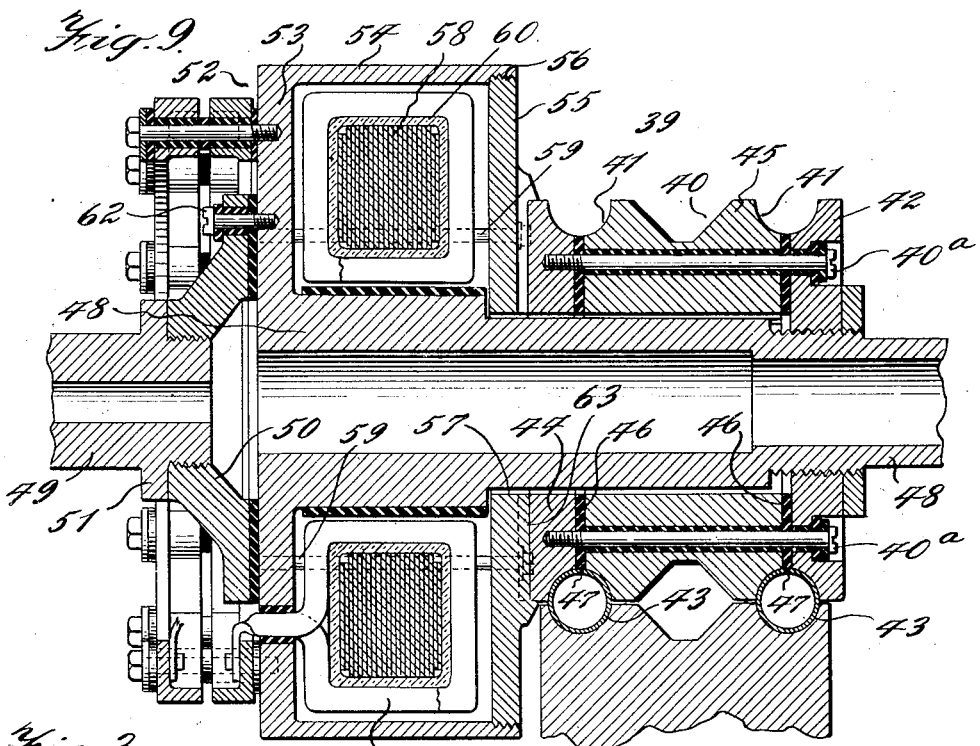
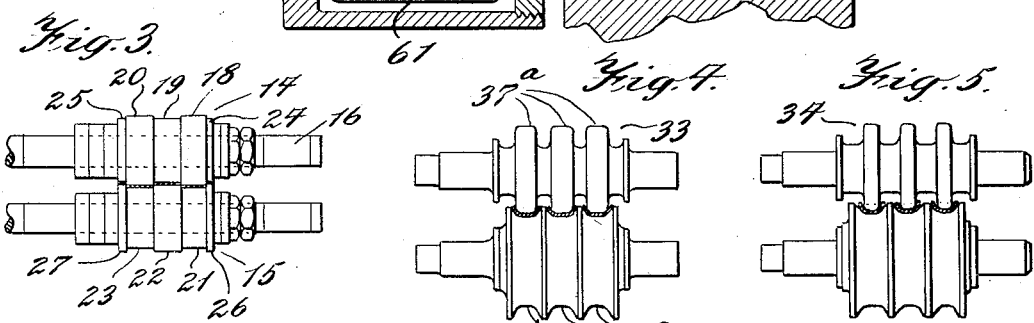
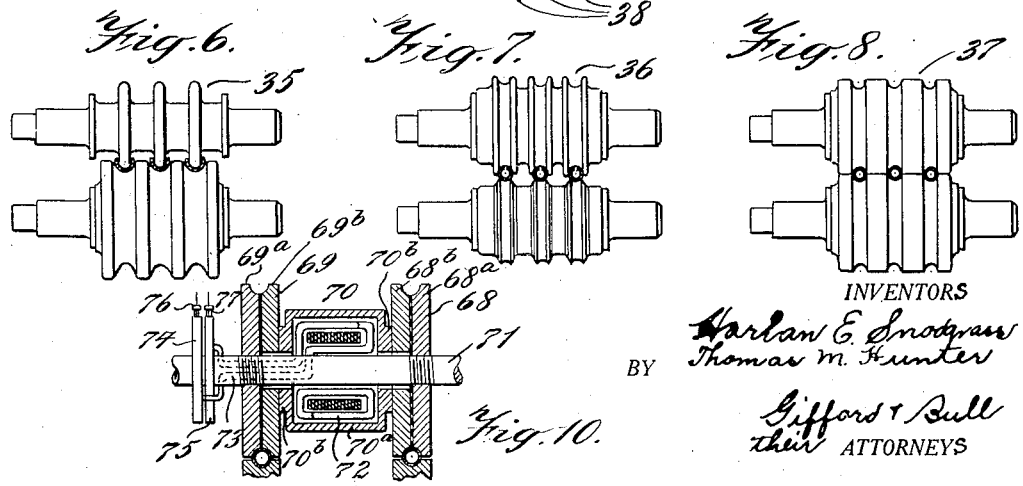
INVENTORS
Harlan E. Snodgrass
Thomas M. Hunter
BY
Gifford & Bull
their ATTORNEYS Patented Jan. 5, 1926.

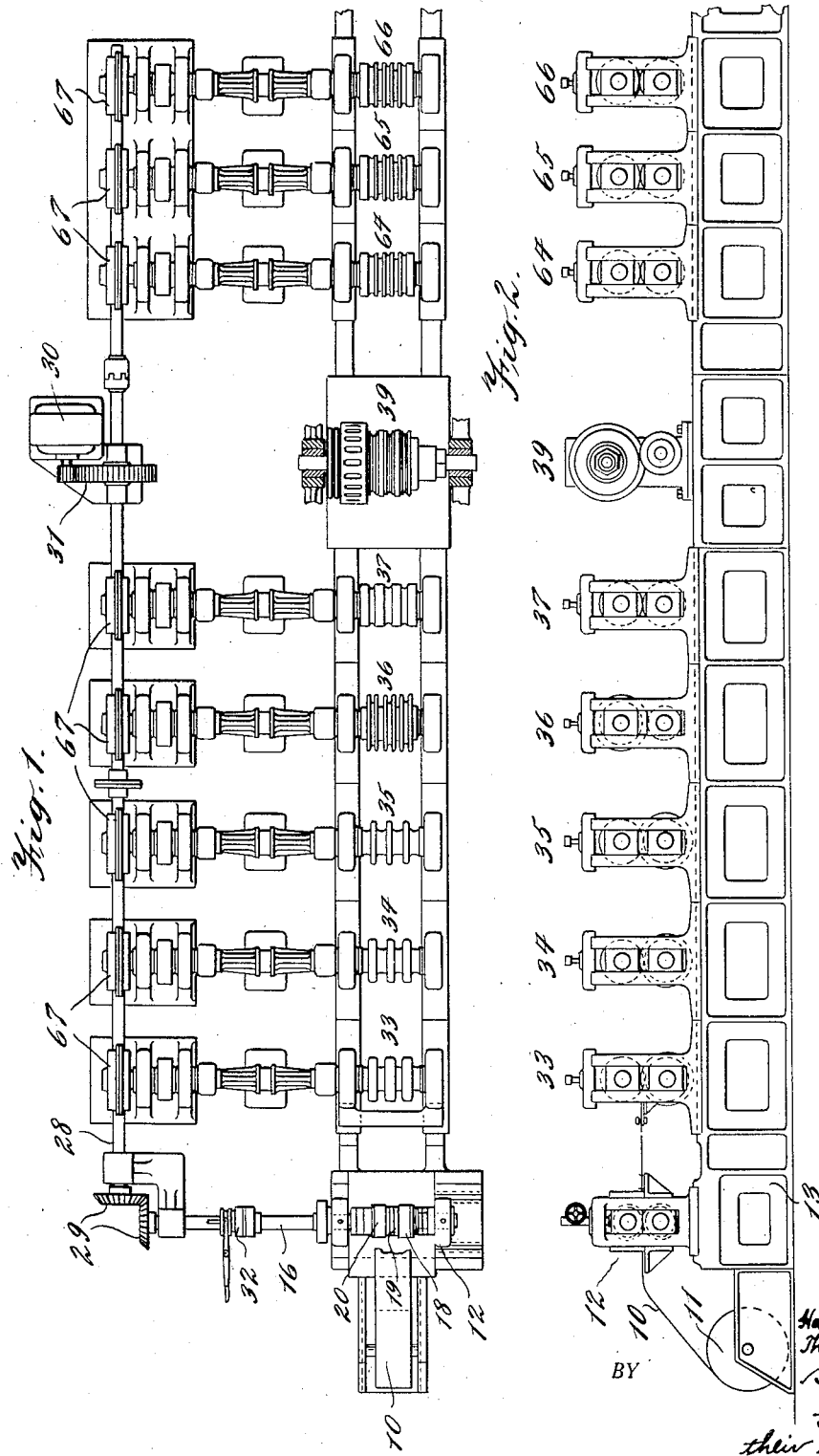

1,568,193

UNITED STATES PATENT OFFICE.

HARLAN E. SNODGRASS, OF SUMMIT, AND THOMAS M. HUNTER, OF NEWARK, NEW JERSEY, ASSIGNORS, BY MESNE ASSIGNMENTS, TO NEWARK TUBE COMPANY, OF NEWARK, NEW JERSEY, A CORPORATION OF NEW JERSEY.

METHOD OF AND APPARATUS FOR WELDING.

Application filed March 24, 1922. Serial No. 546,225

*To all whom it may concern:*

Be it known that we, HARLAN E. SNODGRASS and THOMAS M. HUNTER, citizens of the United States, residing at Summit, in the county of Union and State of New Jersey, and Newark, in the county of Essex and State of New Jersey, respectively, have invented certain new and useful Improvements in a Method of and Apparatus for Welding, of which the following is a specification.

One of the objects of our invention is a novel method of and apparatus for welding, in accordance with which a plurality of welding operations are simultaneously carried out with a single welding machine.

Another object of our invention is a novel method of and apparatus for multiple welding, in which the plurality of members upon which the welding operations are to be performed are simultaneously prepared for welding.

A further object of our invention is a novel method of and apparatus for shearing one or more strips and thereafter forming the strips into tubes and welding the edges thereof, the entire operation being carried out at such a rate that the tube or tubes are brought to the welding point with their freshly sheared edges in weldable condition.

Other objects of our invention will appear in the specification and will be more particularly pointed out in the claims.

In the drawings, in which we have illustrated the preferred form of apparatus for carrying out our invention, Figure 1 is a diagrammatic plan view of the apparatus; Fig. 2 is a side view thereof; Fig. 3 is an end view on a larger scale than Figs. 1 and 2 of the slitting or shearing rolls; Figs. 4, 5, 6, 7 and 8 are end views of the successive forming rolls; Fig. 9 is a longitudinal section through the welding roll and the transformer associated therewith, and Fig. 10 is a modification illustrating welding rolls located on opposite sides of the transformer.

Like reference characters indicate like parts throughout the drawings.

Referring, now, to the drawings, 10 is a blank or sheet of metal, which may conveniently be stored as a coil on a drum 11, from which the blank is unwound during the slitting, forming and welding operations. In accordance with our invention, the blank or sheet 10 is of sufficient width to make, when sheared and formed by suitable devices, a plurality of seamed tubes upon which welding operations are to be performed. The blank 10 is first fed into the shearing or slitting rolls, preferably of the form indicated generally at 12, and mounted upon a frame 13. The two slitting rolls are indicated at 14 and 15, respectively, in Fig. 3. The upper roll is provided with offset annular or disc portions 18, 19 and 20 of alternately differing diameters, so that the successive discs or offset portions present a staggered appearance as viewed from the front of the roll. The disc portions 18, 19 and 20 of the upper roll register with similar disc portions 21, 22 and 23 on the lower roll, and reversely arranged with respect to their diameters to the discs on the lower roll, for example, the disc 18 of the upper row, which is of a relatively large diameter, registers with a disc portion 21 on the lower roll, which is of a relatively small diameter. The upper roll is also provided with outer, narrower disc portions 24 and 25 of differing diameters from the adjacent disc portions 18 and 20, and registering with narrow disc portions 26 and 27 on the lower roll, which also have diameters differing from the adjacent disc portions 21 and 23. The slitting roll from the outside of the discs 24—26 to the outside of the discs 25—27, is preferably approximately the same as the width of the blank which is to be sheared into strips. Now, when the blank is passed between the slitting rolls, the shearing edges of the discs will cut the blank into strips—in the case illustrated in Figs. 1 to 8, three in number—having the widths of the discs 18—21, 19—22 and 20—23, the outer, narrower discs 24—26 and 25—27 operating to shear from the blank sheet the edges thereof. One of the shafts of the slitting rolls, here shown as the upper shaft 16, is preferably driven from a shaft 28 through interposed beveled gearing 29. The shaft 28 may, in turn, be driven by a motor 30, through suitable gearing 31. The shaft 16 is preferably provided with a clutch 32, in order that the slitting rolls may be disconnected from the driving mechanism as soon as the various strips are received in the forming rolls, in a manner that will be directly described, the forming rolls then serving to pull the blank through the machine. It is desirable to disconnect the slitting rolls when the strips have been received by the forming rolls, for the reason that it is necessary occasionally to dress down the slitting rolls, with the consequence that their diameters are subject to greater variation than are those of the forming rolls, which will now be described.

When the sheet blank has been sheared into strips, they are fed to forming rolls, here indicated generally at 33, 34, 35, 36 and 37, which are supported on the frame 13. When three strips are prepared, as here illustrated, the upper one of the first set of forming rolls is provided with three discs, as indicated at 37, and the lower roll is provided with three cooperating rolls 38, which operate upon the respective strips and impart to the same an initial curvature, as indicated. The various strips are further bent as they pass through the successive forming rolls 33, 34, 35, 36 and 37, until, as the tubes pass through the final forming rolls 37, they are formed into seamed tubes with the edges in abutting engagement.

The tubes formed in the manner described, are now received by the welding apparatus, indicated generally at 39 in Fig. 9.

The welding roll 40, which is preferably unitary in character, is provided with grooves 41 in which the tubes are received. Figure 9 illustrates only two such grooves, while three are illustrated in Figure 1. This, however, is only for convenience of illustration, and it will be understood that any desired number of strips and tubes may simultaneously be formed and welded in accordance with our invention. The welding roll 40 is provided with an outer contact member 42, which engages the outer tube 43 on the outer side thereof, and is also provided with an inner contact member 44, which engages the inner tube 43 on the outer side thereof. The welding roll is also provided with one or more intermediate contact members 45 insulated from the end contact members 42 and 44, as at 46, and insulated from each other when more than one intermediate electrode member is used. The intermediate contact member 45 (when one only is used) is grooved at its edges to form with the grooves on the end members, frequently semi-circular, as indicated. The several contact members of the welding roll may conveniently be held together by bolts 40ª passing through the outer and intermediate contact members 42 and 45 and threaded into the inner contact member 44, the bolts being insulated from the outer and intermediate contact members, as indicated. The insulating plates or members 46 preferably extend to the bottoms of the grooves 41, so that the seams 47 of the tubes 43 register with the insulating plates 46. We have illustrated the welding roll associated with a transformer the same as that illustrated in our pending application, Serial No. 399,449, which was filed in the Patent Office on or about July 28, 1920; continuation Serial No. 446,050, filed on or about February 18, 1921. With the transformer and associated parts illustrated, the welding roll 40 is preferably mounted on a hollow shaft or core 48, which is, in turn, carried by and rotatable with the main operating shaft 49, indicated at the left of Fig. 9. A supporting member 50, somewhat cup-shaped, as indicated in Fig. 9, is supported on the end of the shaft 49, the member 50 preferably being provided with a central screw-threaded opening which engages the screw-threaded shaft 49, the supporting member 50 abutting against a flange 51 formed on the shaft 49. The transformer, which is preferably secured to the supporting member 50, comprises a secondary, indicated generally at 52, which may conveniently be formed of a cast metal, such as copper, and which comprises a shell having a face-plate 53 electrically connected to and preferably integral with one end of the core or shaft 48 which extends axially through the transformer. The secondary shell also preferably comprises a cylindrical part 54 preferably integral with the face-plate 53. The opposite side of the secondary shell is closed by a plate 55, which may be screw-threaded on its periphery, as at 56, to engage a similar screw-threaded part on the inner side of the shell 54. The plate 55 is provided with a central opening 57, which is of a slightly greater diameter than the shaft 48, so that the plate 55 is spaced from the shaft sufficiently to insulate the same therefrom. A core 58 for the transformer, preferably annular in form, is located within, and preferably entirely enclosed by, the shell of the secondary of the transformer, the shell of the secondary of the transformer being electrically continuous in the direction of the generated current and throughout the region of the core. The core may be held in position within the secondary by bolts 59 extending through the core and through the plates 53 and 55, respectively. The core is covered by suitable insulation 60 and is surrounded by a primary winding 61, preferably in the form of a flat ribbon wound edgewise around the core. The secondary of the transformer is secured to the supporting member 50 by bolts or screws 62, suitable insulation being interposed between the side 53 of the secondary and the supporting member 50, and suitable insulating material also being interposed between the bolts 62 and the member 50. The plate 55, constituting one terminal of the transformer, is electrically connected to the inner electrode or contact member 44 of the welding roll, the member 44 preferably being seated directly against raised portions 63, while the other end of the secondary is electrically connected through the core or shaft 48 to the outer electrode or contact member 42, the latter preferably having a screw-threaded engagement with the core 48.

While we have illustrated somewhat in detail one form of transformer that is suitable for use with our welding device, it will, of course, be understood that any suitable source of electric current, preferably the secondaries of a transformer, may be connected to the end electrodes of the welding roll.

In operation, the secondary of the transformer which is connected to the end contact members 42 and 44, creates a difference of potential between the two. The circuit is completed, however, only when the tubes are passing through the welding roll. For example, in the arrangement illustrated in Fig. 9, the current from the secondary of the transformer would pass from the end contact member 42, constituting one terminal of the secondary of the transformer, to one side of the tube, across the seam of the tube to the other side thereof, thence to the intermediate contact member 45, to the second tube received in the groove at the left in Fig. 9, across the seam of the tube to the end contact member 44, which constitutes the other terminal of the transformer. In the form illustrated, the welding current would likewise pass across the seams of all of the tubes included in the welding circuit, whatever their number, and the opening of the circuit between any two adjacent electrodes for any reason would result in failure to weld any of the tubes. After passing through the welding apparatus, the various tubes pass through a series of sizing and pulling rolls, here shown as three in number, and indicated generally at 64, 65 and 66, which may be substantially the same as the last pair of forming rolls 37, the welding roll and associated parts, including the transformer, preferably being rotated by the tubes. The forming rolls and the sizing and pulling rolls may be operated from the shaft 28 through either the upper or lower shafts of the rolls (shown only in end view in Fig. 2) through gearing, indicated generally at 67. In Fig. 10 we have illustrated a modified form of our invention, in which at least one welding roll is located at opposite ends of the rotary transformer. The rotary transformer, indicated generally at 70, has a secondary 70ª substantially symmetrical about the axis of rotation, and preferably, though not necessarily, cylindrical in form, the secondary ending in terminals 70ᵇ which are circumferentially continuous. At each end of the transformer is at least one welding roll, two such welding rolls, 68 and 69, being illustrated, one at opposite ends of the transformer, though it will, of course, be understood that more than one roll may be located at either or both ends of the transformer, in accordance with requirements, and may be arranged as in Fig. 9. Each contact roll comprises two contact members 68ª and 68ᵇ, and 69ª and 69ᵇ, and insulated from each other and engaging the tube on opposite sides of the seam thereof. Two of the contact members of the respective rolls, and preferably the outer contact members, as illustrated, are electrically connected together, preferably through the shaft, as shown; while the other two contact members are electrically connected to the remaining contact members of the rolls. The primary 72 of the transformer may be connected by conductors 73 to collector-rings 74 and 75 mounted on the shaft, as indicated, to which current is supplied through suitable brushes 76 and 77.

In accordance with our invention, a plurality of seamed tubes are simultaneously welded without the use of sliding contacts such as have hitherto been considered necessary in work of this character.

In accordance with our invention, a plurality of strips are sheared from a single strip, and formed into tubes, and welded in a single operation and in a single machine, which greatly facilitates the preparation and welding of the tubes, the shearing, forming and welding operations preferably being carried out on the same center line of each strip.

By shearing the metal, forming it into a tube or tubes, and feeding the tube or tubes to the welding point at such a rate as to preserve the edges of the tubes in a weldable condition, and then welding the tubes, we avoid such operations as filing the edges of the strips, scarfing the same, pickling the blanks, and other similar operations which have been required when an appreciable time intervenes between the preparation of the strips to be welded and the welding operation.

It will be apparent that by preparing and welding a plurality of tubes in a single machine, the cost of labor is greatly reduced. Furthermore, our invention lends itself to economy, as the large transformer required for simultaneously welding a plurality of tubes with a single current can be built more economically than can a plurality of small ones, and of the same total capacity, and is more efficient in operation. The length of path of the secondary current, in which is included two or more tubes, is not substantially greater than that for a single tube, and the percentage of inductance of the secondary circuit would, therefore, be correspondingly less, and is approximately inversely proportional to the number of tubes when expressed in per cent of total secondary voltage. Further, the per cent I²R loss of the secondary circuit is proportionately reduced as the number of tubes is increased. By welding a plurality of tubes with a single current, the power factor is increased.

What we claim and desire to secure by Letters Patent of the United States is:

1. The method of welding a plurality of seamed tubes which consists in maintaining the edges of the tubes on opposite sides of the seams in abutting engagement, and utilizing the secondary current of a single transformer for simultaneously welding the seams of the various tubes.

2. The method of simultaneously welding a plurality of seamed tubes which consists in maintaining the edges of the tubes on opposite sides of the seams in abutting engagement, and passing a single welding current across the various seams to be welded.

3. The method of simultaneously welding a plurality of seamed tubes which consists in maintaining the edges of the tubes on opposite sides of the seams in abutting engagement as defined by a single plane transverse to the tubes, and passing a single welding current across the seams of the various tubes to be welded at the common transverse plane.

4. The method of simultaneously welding a plurality of seamed tubes which consists in maintaining the edges of the tubes on opposite sides of the seams in abutting engagement and passing a single alternating welding current across the various seams to be welded.

5. The method which consists in simultaneously shearing a single blank into a plurality of strips, forming the strips into tubes with their edges in abutting engagement, and passing a single welding current across the various seams to be welded.

6. The method which consists in simultaneously shearing a single blank into a plurality of strips, forming the strips into tubes with their edges in abutting engagement, feeding the strips and tubes forwardly to a welding point at such a rate as to preserve the freshly sheared edges of the strips in weldable condition, and passing a single welding current across the various seams to be welded.

7. The improvement in the method which consists in simultaneously forming a plurality of strips into seamed tubes with their edges in abutting engagement, and passing a single welding current across the various seams.

8. In a welding machine, means for simultaneously feeding to the machine a plurality of seamed tubes in parallel relation, and means for passing across the seams of the various tubes a single welding current.

9. In a welding apparatus for simultaneously welding a plurality of seamed tubes, a plurality of contact members engaging the tubes on opposite sides of the seams, the contact members engaging the sides of any tube on opposite sides of the seam being insulated, and the electrodes engaging the facing sides of adjacent tubes being electrically connected.

10. In a welding apparatus for simultaneously welding a plurality of seamed tubes, a plurality of contact members engaging the tubes on opposite sides of the seams, the contact members engaging the sides of any tube on opposite sides of the seam being insulated and the electrodes engaging the facing sides of adjacent tubes being electrically connected, and means for passing a single welding current across the seams of the various tubes engaged by said contact members.

11. A welding apparatus comprising a multipart welding roll comprising end electrodes adapted to engage the outer sides of seamed tubes, said electrodes being connected to a source of welding current and also comprising one or more intermediate contact members insulated from the end electrodes and from each other, and constructed and arranged to engage facing sides of adjacent tubes, and means for passing a single welding current across the seams of the various tubes engaged by said roll.

12. A welding apparatus comprising a unitary welding roll formed with a plurality of grooves adapted to receive seamed tubes, the roll being divided by insulation, registering with the seams of the tubes, into a plurality of conducting members engaging the tubes on opposite sides of the seams, and means for passing a single welding current across the seams of the various tubes with which said roll engages.

13. A welding apparatus comprising a unitary welding roll formed with a plurality of grooves adapted to receive seamed tubes, the roll being divided by insulation, registering with the seams of the tubes, into a plurality of conducting members engaging the tubes on opposite sides of the seams, the end conducting members being adapted to be connected to a source of welding current.

14. A welding apparatus comprising a unitary welding roll formed with a plurality of grooves adapted to receive seamed tubes, the roll being divided by insulation, registering with the seams of the tubes, into a plurality of conducting members engaging the tubes on opposite sides of the seams, and means for connecting a source of alternating current to the end conducting members.

15. A welding apparatus comprising a unitary welding roll formed with a plurality of grooves adapted to receive seamed tubes, the roll being divided by insulation, registering with the seams of the tubes, into a plurality of conducting members engaging the tubes on opposite sides of the seams, and a transformer having its secondary connected to the end conducting members of said welding roll.

16. A welding apparatus comprising a unitary welding roll formed with a plurality of grooves adapted to receive seamed tubes, the rolls being divided by insulating plates, registering with the seams of the tubes, into a plurality of conducting members engaging the tubes on opposite sides of the seams, and a rotary transformer rotatable with said welding roll and having its secondary connected to the end members of said roll.

17. In combination, a unitary welding roll formed with a plurality of grooves adapted to receive seamed tubes, the rolls being divided by insulated plates, registering with the seams of the tubes, into a plurality of conducting members engaging the tubes on opposite sides of the seams, and a transformer mounted beside said welding roll on a shaft common to said roll, the secondary of said transformer being electrically connected to the inner contact member of said roll, and to the outer contact member of said roll through said shaft.

18. In a welding machine, a single welding roll provided with a plurality of grooves adapted to receive tubes to be welded, and associated means for passing welding current across the various tubes to be welded.

19. In a welding machine, a single welding roll provided with a plurality of grooves adapted to receive tubes to be welded, the roll being formed on opposite sides of each groove with insulated contact members for engaging the co-operating tube on opposite sides of the seam thereof, and a transformer for supplying current to simultaneously weld the various tubes.

20. In a welding machine, a single welding roll provided with a plurality of grooves adapted to receive tubes to be welded, the roll being formed on opposite sides of each groove with insulated contact members for engaging the co-operating tube on opposite sides of the seam thereof, and a transformer rotatable with said roll for simultaneously supplying current to the various tubes.

21. In a welding machine, means for shearing a blank metal sheet into a plurality of strips, means for forming the strips into seamed tubes with their edges in abutting engagement, means for feeding forwardly the strips and tubes at such a rate as to preserve their edges in weldable condition, and means for passing a single welding current across the seams of the various tubes.

22. In a welding machine, means for shearing a blank metal sheet into a plurality of strips, means for forming the strips into seamed tubes with their edges in abutting engagement, means for feeding forwardly the strips and tubes to a welding point at such a rate as to preserve the sheared edges in weldable condition, and means for simultaneously welding said tubes with a single welding current.

23. In a welding apparatus for simultaneously welding a plurality of seamed tubes, a rotatable transformer having a secondary substantially symmetrical about the axis of rotation, and a plurality of welding rolls rotatable with the transformer, each roll comprising two insulated contact members for engaging the tube on opposite sides of the tube seam, two of the welding rolls each having a contact member connected to the respective terminals of the secondary of the transformer and each of the remaining contact members of any roll being electrically connected to one of the remaining contact members of another roll.

24. In a welding apparatus for simultaneously welding a plurality of seamed tubes, a rotatable welding transformer having a secondary substantially symmetrical about the axis of rotation, a plurality of welding rolls rotatable with the transformer, each welding roll comprising contact members engaging the tube on opposite sides of the seam thereof and the contact members of each roll being insulated from each other, the parts being constructed and arranged to produce a single welding current through the secondary of the transformer and through the various welding rolls when the contact members thereof are bridged by the tubes.

25. In a welding apparatus for simultaneously welding a plurality of seamed tubes, a rotatable welding transformer having a secondary substantially symmetrical about the axis of rotation, and at least one welding roll at opposite sides of the transformer and rotatable therewith, each welding roll comprising contact members insulated from each other for engaging the tube on opposite sides of the seam thereof, the parts being constructed and arranged to produce a single welding current through the secondary of the transformer and through the various welding rolls when the contact members thereof are bridged by the tubes.

26. In a welding apparatus for simultaneously welding a plurality of seamed tubes, a rotatable welding transformer having a secondary substantially symmetrical about the axis of rotation and terminating at either end in a circumferentially continuous contact member, at least one welding roll located at each end of the transformer and rotatable therewith, each welding roll comprising two circumferentially continuous contact members insulated from each other for engaging the tube on opposite sides of the seam, the inner contact members of the inner rolls being electrically connected to the respective terminals of the secondary of the transformer and the outer contact members thereof being electrically connected together.

27. In a welding apparatus, an operating shaft, a rotatable transformer comprising a secondary substantially symmetrical about the axis of rotation, at least one welding roll on opposite sides of the transformer, each welding roll comprising insulated contact members for engaging the tube on opposite sides of the seam thereof, the outer contact members of the outer welding rolls being electrically connected to said shaft and the inner contact members of the inner rolls being electrically connected to the terminals of the transformer, each remaining contact member of any welding roll being electrically connected to one of the remaining contact members of another roll, the transformer and the remaining contact members being insulated from said shaft.

28. In a welding apparatus, an operating shaft, a rotatable transformer surrounding said shaft and having a cylindrical secondary terminating in circumferentially continuous terminals, a welding roll at each end of said transformer and rotatable therewith, each welding roll comprising two insulated contact members for engaging the tube on opposite sides of the seam thereof, two of the contact members of said rolls being electrically connected to said shaft and the other two being electrically connected together.

29. In a welding apparatus, an operating shaft, a rotatable transformer surrounding said shaft and insulated therefrom and having a secondary substantially symmetrical about the axis of said shaft, and a welding roll at each end of said transformer, each roll comprising two contact members for engaging the tube on opposite sides of the seam thereof, the outer contact members of said rolls being electrically connected to said shaft and the inner contact members of said rolls being electrically connected to the respective terminals of the secondary of the transformer

HARLAN E. SNODGRASS.
THOMAS M. HUNTER.